(12) United States Patent
Venkataraman et al.

(10) Patent No.: US 10,459,951 B2
(45) Date of Patent: Oct. 29, 2019

(54) METHOD AND SYSTEM FOR DETERMINING AUTOMATION SEQUENCES FOR RESOLUTION OF AN INCIDENT TICKET

(71) Applicant: Wipro Limited, Bangalore (IN)

(72) Inventors: Arthi Venkataraman, Bangalore (IN); Amit Singh, Badarpur (IN); Rahul Prajapati, Indore (IN)

(73) Assignee: Wipro Limited, Bangalore (IN)

( * ) Notice: Subject to any disclaimer, the term of this patent is extended or adjusted under 35 U.S.C. 154(b) by 312 days.

(21) Appl. No.: 15/278,290

(22) Filed: Sep. 28, 2016

(65) Prior Publication Data
US 2018/0032601 A1    Feb. 1, 2018

(30) Foreign Application Priority Data
Jul. 30, 2016 (IN) .............................. 201641026134

(51) Int. Cl.
*G06F 7/00* (2006.01)
*G06F 16/28* (2019.01)
*G06F 16/2457* (2019.01)

(52) U.S. Cl.
CPC ...... *G06F 16/285* (2019.01); *G06F 16/24578* (2019.01)

(58) Field of Classification Search
CPC .......... G06F 17/30598; G06F 17/3053; G06F 3/1205; G06F 1/0335; G06F 7/68; G06F 17/18
USPC ................. 707/738, 727, 737, 750, 999.006
See application file for complete search history.

(56) References Cited

U.S. PATENT DOCUMENTS

| | | | | |
|---|---|---|---|---|
| 5,666,481 A * | 9/1997 | Lewis | ................. | G06F 11/2257 714/15 |
| 6,109,776 A * | 8/2000 | Haas | ....................... | G06F 19/24 435/6.16 |
| 6,389,426 B1 * | 5/2002 | Turnbull | ................ | G06Q 10/10 379/201.1 |
| 6,553,360 B1 * | 4/2003 | Hoekstra | ................ | G06N 5/046 706/46 |
| 6,829,734 B1 * | 12/2004 | Kreulen | ................ | G06Q 30/02 379/9.02 |
| 8,365,019 B2 | 1/2013 | Sailer et al. | | |
| 8,473,432 B2 | 6/2013 | Anerousis et al. | | |

(Continued)

*Primary Examiner* — Mohammed R Uddin
(74) *Attorney, Agent, or Firm* — Finnegan, Henderson, Farabow, Garrett & Dunner, LLP

(57) ABSTRACT

The present disclosure relates to a method and system for determining automation sequences for resolution of an incident ticket by an automation system. The automation system retrieves data associated with plurality of incident tickets received from a ticketing system during predefined time duration and groups the plurality of incident tickets into one or more clusters based on the data. The automation system receives a plurality of user actions associated with the plurality of incident tickets performed across a plurality of user devices and identifies similarity among sequences of the plurality of user actions for each ticket cluster. Based on the similarity, the automation system groups the sequences of the plurality of user actions into one or more bucket and determines automation sequences for resolution of the incident ticket by correlating the data associated with plurality of incident tickets with one or more buckets of the sequences.

18 Claims, 8 Drawing Sheets

(56) References Cited

U.S. PATENT DOCUMENTS

| | | | |
|---|---|---|---|
| 8,713,033 B1* | 4/2014 | Stoverink | G06Q 10/06312 705/7.12 |
| 8,868,973 B2 | 10/2014 | Milojicic et al. | |
| 9,229,800 B2 | 1/2016 | Jain et al. | |
| 9,317,829 B2* | 4/2016 | Anand | G06Q 10/0635 |
| 2002/0169783 A1* | 11/2002 | Kreulen | G06F 17/3071 |
| 2005/0081118 A1* | 4/2005 | Cheston | G06F 11/0748 714/47.1 |
| 2007/0116185 A1* | 5/2007 | Savoor | H04M 3/5191 379/9 |
| 2008/0086690 A1* | 4/2008 | Verma | H04L 12/66 715/736 |
| 2008/0155564 A1* | 6/2008 | Shcherbina | G06Q 10/04 719/318 |
| 2008/0172574 A1* | 7/2008 | Fisher | G06Q 10/06 714/25 |
| 2009/0063387 A1* | 3/2009 | Beaty | G06N 5/04 706/50 |
| 2011/0055699 A1* | 3/2011 | Li | G06F 17/30864 715/709 |
| 2012/0023044 A1* | 1/2012 | Anerousis | G06N 5/043 706/12 |
| 2012/0066547 A1* | 3/2012 | Gilbert | H04L 41/065 714/26 |
| 2013/0090976 A1* | 4/2013 | White | G06Q 10/20 705/7.27 |
| 2013/0198116 A1* | 8/2013 | Bhamidipaty | H04L 41/5074 706/12 |
| 2014/0129536 A1* | 5/2014 | Anand | G06Q 10/0635 707/706 |
| 2014/0149411 A1* | 5/2014 | Anand | G06F 17/30654 707/737 |
| 2014/0325254 A1* | 10/2014 | Mani | G06F 16/285 714/2 |
| 2015/0033077 A1* | 1/2015 | Bhamidipaty | H04L 41/5074 714/37 |
| 2015/0039289 A1* | 2/2015 | Mabogunje | G06Q 10/10 704/9 |
| 2015/0113008 A1* | 4/2015 | Deshmukh | H04L 67/2819 707/754 |
| 2016/0224910 A1* | 8/2016 | Deng | G06Q 10/0633 |
| 2016/0378859 A1* | 12/2016 | Banik | G06F 17/30713 707/708 |
| 2017/0011308 A1* | 1/2017 | Sun | G06N 99/005 |
| 2017/0076296 A1* | 3/2017 | Hirpara | G06F 17/30707 |
| 2017/0161335 A1* | 6/2017 | Akula | G06F 17/30528 |

\* cited by examiner

METHOD AND SYSTEM FOR DETERMINING AUTOMATION SEQUENCES FOR RESOLUTION OF AN INCIDENT TICKET

FIELD OF THE INVENTION

The present subject matter is related in general to the field of incident ticket resolution, more particularly, but not exclusively to a method and system for determining automation sequences for resolution of an incident ticket.

BACKGROUND

Information technology has grown widely in the recent years. With the increasing dependency of the society on software driven systems, reliability on the software product has become one of the key factors in the industries. In the present scenario, many business processes rely on the information technology systems for majority of their work. Due to a major dependency of the businesses, the organizations usually set up one or more support teams for resolving incidents or service requests by performing support actions. Today, typically in a helpline system, when any issues are raised associated with the information infrastructure the service representative understands the description of the issue. Based on the understanding, the users access different back-end systems to resolve the issue. Generally, the issues raised are repetitive in nature and most of them require similar solutions. However, most of the actions for resolving the issues are done manually. In order to automate the resolution process, the entire workflow of the resolution process is required to be analyzed by the user and automation opportunities need to be determined. Since the number of the issues raised is generally more, determination of the automation opportunities becomes a time consuming operation.

In order to resolve the issue, there are many solution and techniques. Auto complete is one of the existing techniques for resolving the issues raised in a support system, in the auto complete technique, generally a value is associated with a field name which is learnt when the field is filled. Whenever a similar field appears anywhere, a suggestion is given for the possible value of the field. However, the solution in the auto complete technique is very specific for learning a value and to be filled for a field. Also, the auto complete technique cannot be used outside the context of the specific user. In yet another existing technique of record and playback, there are many test automation solutions where the sequences of actions performed by the users are captured and saved. On playback, the same actions are played back for resolution. However, in the record playback technique, the users are required to identify the starting and the stopping of the automation. The system on its own cannot identify the starting and the stopping phase. Also, the solutions provided in the record playback technique are limited to a single device and has no correlation of actions performed across systems and with the issues raised.

Thus, the existing techniques may not be efficient in determining the automation opportunities performed across different system. Thus, there is a need for a system which determines automation opportunities for the resolution of tickets.

SUMMARY

In an embodiment, the present disclosure relates to a method for determining automation sequences for resolution of an incident ticket. The method comprises retrieving data associated with plurality of incident tickets received from a ticketing system during a predefined time duration, grouping the plurality of incident tickets into one or more clusters based on the data, receiving a plurality of user actions associated with the plurality of incident tickets performed across a plurality of user devices, identifying similarity among sequences of the plurality of user actions for each ticket cluster, grouping the sequences of the plurality of user actions into one or more buckets based on the similarity and determining automation sequences for resolution of the incident ticket by correlating the data associated with the plurality of incident tickets with one or more buckets of the sequences.

In an embodiment, the present disclosure relates to an automation system for determining automation sequences for resolution of an incident ticket. The automation system comprises a processor and a memory communicatively coupled to the processor, wherein the memory stores processor executable instructions, which, on execution, causes the data automation system to retrieve data associated with plurality of incident tickets received from a ticketing system during a predefined time duration, group the plurality of incident tickets into one or more clusters based on the data, receive a plurality of user actions associated with the plurality of incident tickets performed across a plurality of user devices, identify similarity among sequences of the plurality of user actions for each ticket cluster, group the sequences of the plurality of user actions into one or more buckets based on the similarity and determine automation sequences for resolution of the incident ticket by correlating the data associated with the plurality of incident tickets with one or more buckets of the sequences.

In an embodiment, the present disclosure relates to a non-transitory computer readable medium including instructions stored thereon that when processed by at least one processor cause an automation system to retrieve data associated with plurality of incident tickets received from a ticketing system during a predefined time duration, group the plurality of incident tickets into one or more clusters based on the data, receive a plurality of user actions associated with the plurality of incident tickets performed across a plurality of user devices, identify similarity among sequences of the plurality of user actions for each ticket cluster, group the sequences of the plurality of user actions into one or more buckets based on the similarity and determine automation sequences for resolution of the incident ticket by correlating the data associated with the plurality of incident tickets with one or more buckets of the sequences.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
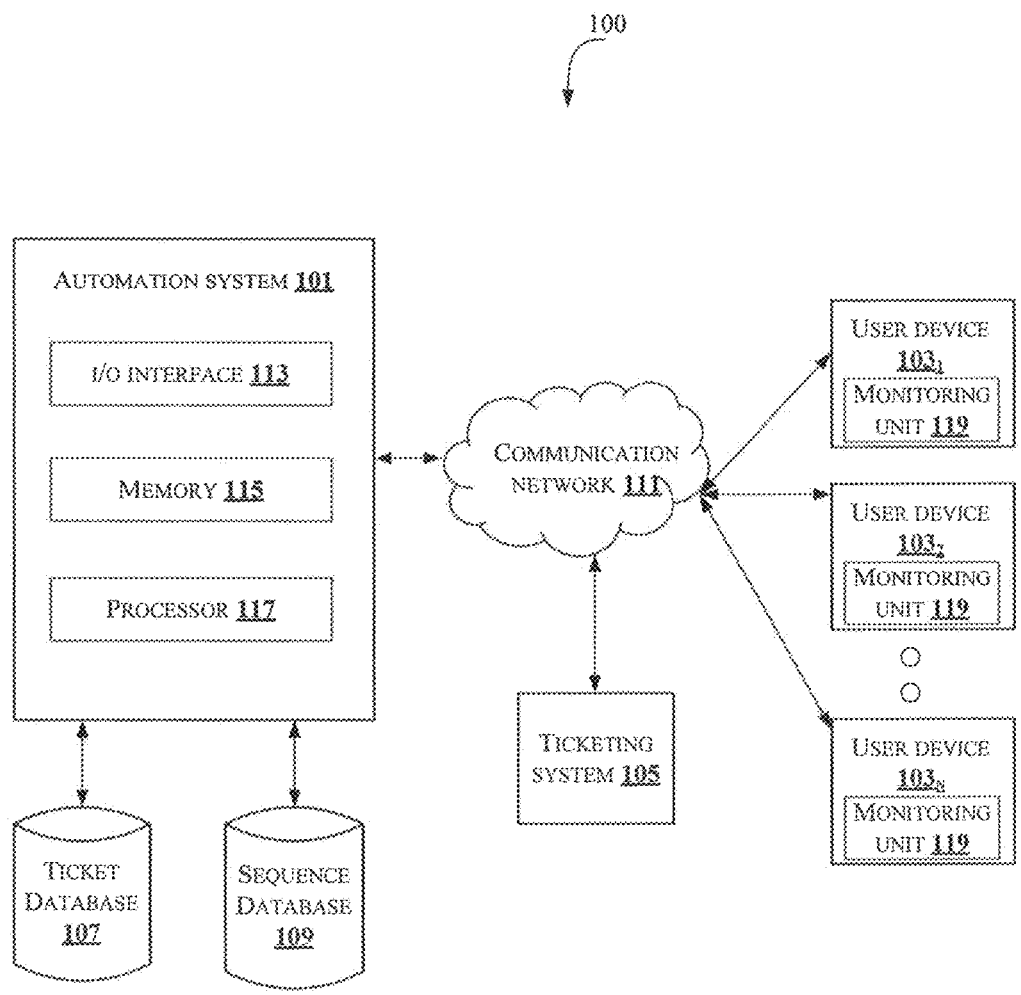
FIG. 1a illustrates an exemplary environment for determining automation sequences for resolution of incident tickets in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to method for determining the automation sequences for resolution of an incident ticket. The present disclosure provides an automation system which determines the automation sequences for a plurality of incident tickets based on the description of the issues associated with each of the incident tickets and plurality of user actions. The automation system receives a plurality of user actions associated with the incident tickets and assigns a unique identifier to each type of action s of the user actions. The sequences of the user actions are scored to find the similarity among them. Based on the similarity, the sequences are grouped into one or more buckets. In an embodiment, the scoring of the sequences of user actions help in identifying similar sequences and sub-sequences of each sequence. Once the similar sequences are identified, the automation system determines automation sequences for the incident ticket by correlating the information of the plurality of incident tickets with the one or more buckets of sequences identified.

FIG. 1a illustrates an exemplary environment for determining automation sequences for resolution of incident tickets in accordance with some embodiments of the present disclosure.

As shown in FIG. 1a, the environment 100 comprises an automation system 101, a user device $103_1$, a user device $103_2$ . . . a user device $103_N$ (collectively referred as plurality of user devices 103) and a ticketing system 105 connected through a communication network 111. The automation system 101 is also connected to a ticket database 107 and a sequence database 109. In an embodiment, the plurality of user devices 103 include, but are not limited to, desktop computers, a Personal Computer (PC), a notebook, a smartphone, a tablet, laptops and any other computing devices. The ticketing system 105 is usually populated with a plurality of incident tickets. In an embodiment, the incident tickets refer to a report on a particular problem, its status and relevant information. The ticketing system 105 comprises data for each of the plurality of incident tickets logged. In an embodiment, the data associated with the plurality of incident tickets comprise description of the issues associated with each of the incident ticket. Further, in order to resolve the incident tickets, the plurality of user devices 103 perform a plurality of user actions depending on the issues of the corresponding incident ticket. In an embodiment, the plurality of user actions comprise information about at least one of launching an application, mouse and cursor movement, types of keystrokes, touch screen data, web portal access data, remote device access data, navigations across different applications, command and data entered and field data. The automation system 101 populates and updates the ticket database 107. The ticket database 107 comprises the list of incident tickets which are resolved during a specific time duration. Along with the list of resolved incident tickets the ticket database 107 comprises ticket id, user who resolved the incident ticket, start time of the resolution, end time of resolution, and ticket description. The sequence database 109 comprises identified automation sequences associated with the resolution of an incident ticket.

The automation system 101 comprises an I/O Interface 113, a memory 115 and a processor 117. The I/O interface 113 is configured to retrieve data associated with the plurality of incident tickets from the ticketing system 105. The I/O interface 113 also receives a plurality of user actions associated with the plurality of incident tickets from the plurality of user devices 103.

The received information from the I/O interface 113 is stored in the memory 115. The memory 115 is communicatively coupled to the processor 117 of the automation system 101. The memory 115 also stores processor instructions which cause the processor 117 to execute the instruction in order to determine automation sequences for resolution of incident ticket.

Figure 2A:
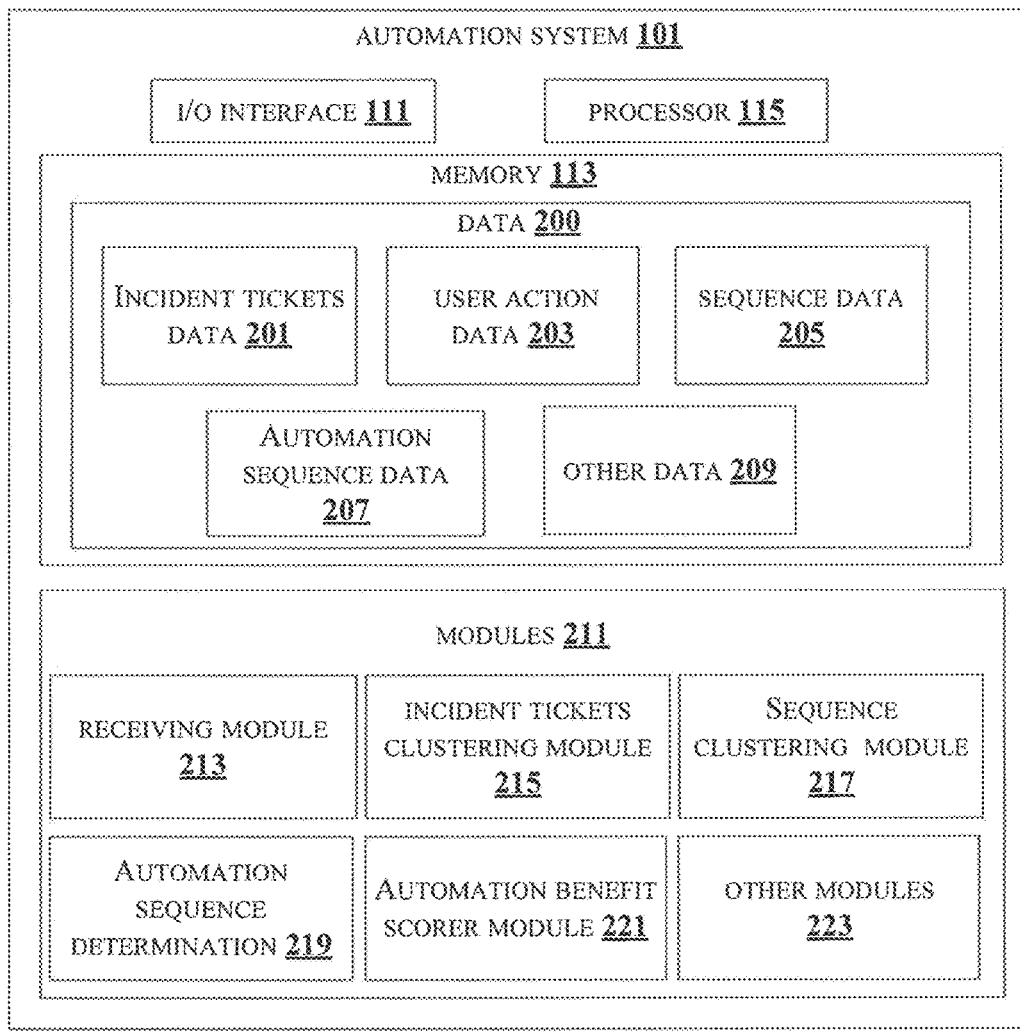
FIG. 2a shows a detailed block diagram of an automation system in accordance with some embodiments of the present disclosure.

FIG. 2a shows a detailed block diagram of an automation system in accordance with some embodiments of the present disclosure.

One or more data 200 and one or more modules 211 of the automation system 101 are described herein in detail. In an embodiment, the one or more data 200 comprises incident tickets data 201, user action data 203, sequence data 205, automation sequence data 207 and other data 209 for determining automation sequences for resolution of an incident ticket.

The incident tickets data 201 comprises the list of the incident tickets received from the ticketing system 105. The incident tickets are entered by the users at pre-defined time duration in the ticketing system 105. The incident tickets data 201 also comprises the description of the issues associated with each incident ticket. Further, the incident tickets data 201 comprises information about the one or more clusters of the incident ticket. Each of the incident tickets are clustered based on the similarity of the incident tickets identified from the corresponding issues.

The user action data 203 comprises information about the plurality of user actions performed across the plurality of user devices 103. In an embodiment, the user actions associated with an incident ticket include, but are not limited to, information about launching an application, mouse and cursor movement, types of keystrokes, touch screen data, web portal access data, remote device access data, navigations across different applications, command and data entered and field data. In an embodiment, the field data may comprise application name, keys pressed by the users, location data of the key pressed, timestamps and user details performing the user actions.

The sequence data 205 comprises information about the sequence of the plurality of user actions. The sequence data 205 comprises the sequences which are identified from the user actions for each of the incident ticket. The sequence data 205 comprises the sequence of user actions with a unique identifier.

The automation sequence data 207 comprises the sequences of user actions which are identified for automation associated with the plurality of incident tickets. The automation sequences are grouped into similar buckets. The automation sequences in the buckets are correlated with the incident tickets by which the incident tickets are resolved.

The other data 209 may store data, including temporary data and temporary files, generated by modules for performing the various functions of the automation system 101.

In an embodiment, the one or more data 200 in the memory 113 are processed by the one or more modules 211 of the automation system 101. As used herein, the term module refers to an application specific integrated circuit (ASIC), an electronic circuit, a field-programmable gate arrays (FPGA), Programmable System-on-Chip (PSoC), a combinatonal logic circuit, and/or other suitable components that provide the described functionality. The said modules when configured with the functionality defined in the present disclosure will result in a novel hardware.

In one implementation, the one or more modules 211 may include, for example, receiving module 213, incident tickets clustering module 215, sequence clustering module 217, automation sequence determination module 219 and automation benefit scorer module 221.

Figure 2B:
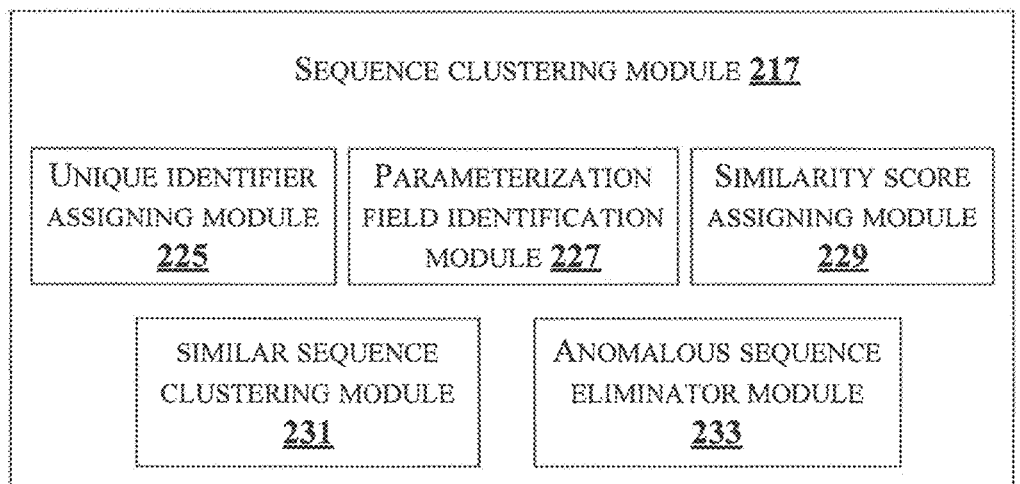
FIG. 2b illustrates a block diagram of sequences clustering module in accordance with some embodiment of the present disclosure.
Figure 2C:
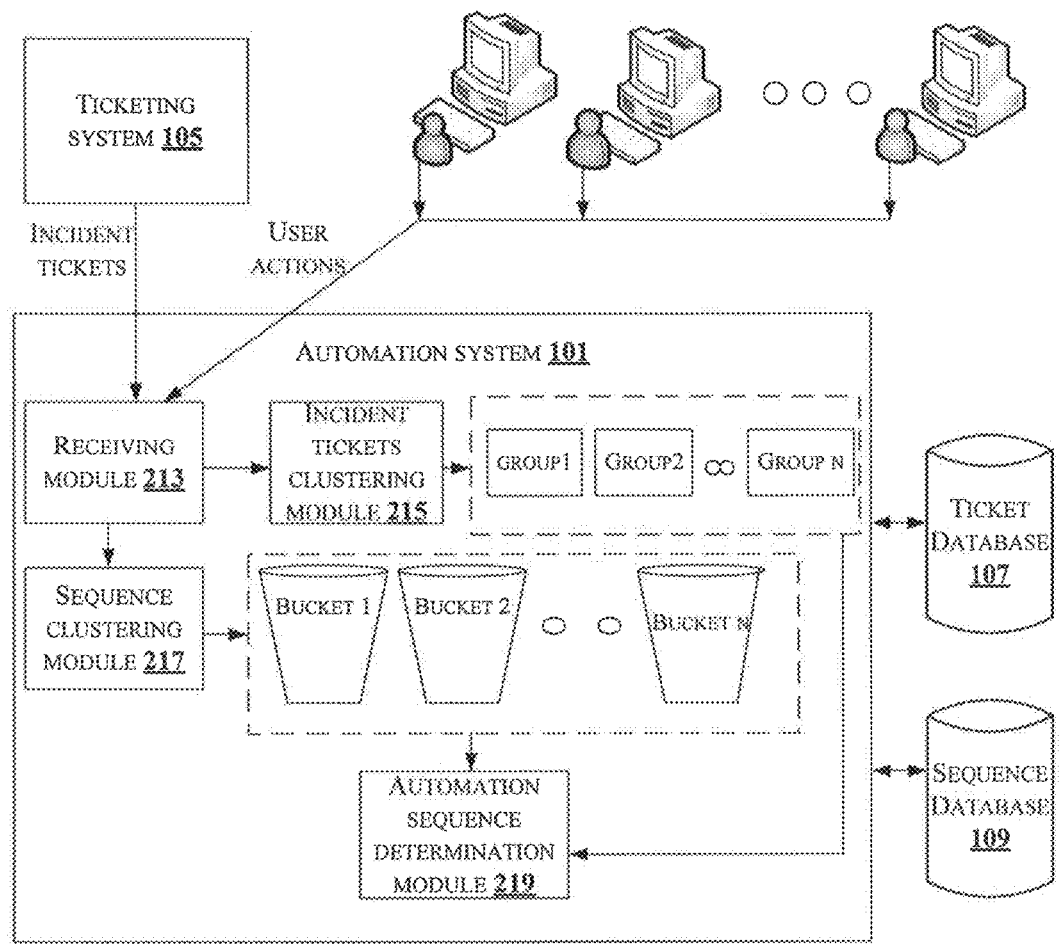
FIG. 2c shows an exemplary environment illustrating data flow between different modules of automation system in accordance with some embodiment of the present disclosure.

The one or more modules 211 may also comprise other modules 223 to perform various miscellaneous functionalities of the automation system 101. It will be appreciated that such aforementioned modules may be represented as a single module or a combination of different modules. FIG. 2c shows an exemplary environment illustrating data flow between different modules of automation system in accordance with some embodiment of the present disclosure.

Figure 1B:
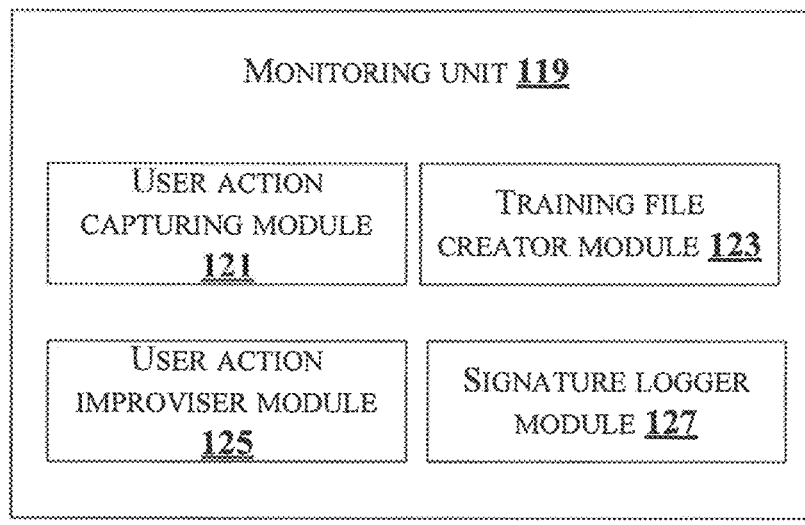
FIG. 1b illustrates a monitoring unit configured in user devices in accordance with some embodiments of the present disclosure.

The receiving module 213 receives the list of incident tickets which were logged and resolved during pre-defined time duration along with the data associated with the plurality of incident tickets from the ticketing system 105. Further, the receiving module 213 also receives the plurality of user actions associated with each of the incident tickets from the plurality of user devices 103. In an embodiment, the plurality of user actions is performed by the user across the plurality of user devices 103 for resolving the plurality of incident tickets. The plurality of user actions are captured by the monitoring unit 119 of each of the user devices. FIG. 1b illustrates a monitoring unit configured in user devices in accordance with some embodiments of the present disclosure. In an embodiment, the monitoring unit 119 is software which runs on the plurality of user devices 103. As shown in FIG. 1b, the monitoring unit 119 comprises a user action capturing module 121, training file creator module 123, user action improviser module 125 and a signature logger module 127. The user action capturing module 121 captures the user actions performed by the user on the user devices. In an embodiment, the user actions comprise information about at least one of launching an application, mouse and cursor movement, types of keystrokes, touch screen data, web portal access data, remote device access data, navigations across different applications, command and data entered and field data. The user actions associated with each type of the incident tickets are captured. Further, the user action capturing module 121 captures all the relevant fields associated with each action in the form of a string. The field data comprise application name, keys pressed by the users, location data of the key pressed, timestamps and user details performing the user actions. For example, a sample sequence is given below.

27183923|calculator|key_press|D0|image|static||0|0|197452||
 calc.exe|C:
 \windows\system32\calc.exe|6180|405,227,633,
 543                                                                                  (1)

In the above sequence, the application name is calculator, the user action comprises a key press and the key pressed is D0. The application path is C:\windows\system32\calc.exe and the process handle is 6180 and screen pixel location is 405,227,633,549.

Further, to improve the accuracy of capturing the user action, the plurality of user devices 103 are pre-trained with the in-scope screens using the training file creator module 123. The training file creator module 123 processes the images of different screens and extracts the key field names in the captured images with the relative positions on the screen. In an embodiment, for every screen, the field names, the associated application name, field relative position in the screen, type of the field value are pre-extracted automatically into a file.

The user action improviser module 125 improves the event of capturing the user actions using a predefined trained file. In an embodiment, whenever a new screen appears at the time of user action capturing, the user action improviser module 125 compares the screens to find the correct matching screen from the pre-defined screen. The user action improviser module 125 compares the screen to ensure that the user actions captured are independent of the device from where the user logs in and the screen resolution of the device. Further, the comparison of the screen also ensures that the captured user action data 203 is same when the application is opened on a mobile device screen or a large screen.

The signature logger module 127 saves the updated action signature into local action logs.

Returning to FIG. 2a, the incident tickets clustering module 215 clusters the similar incident tickets into one cluster. The clustering is performed based on the similarity in the description of the issues raised in each of the incident ticket. For instance, if the description of issue for a first incident ticket comprises login issue and the description of issue for a second incident ticket comprises unable to login then both the first and second incident tickets are placed in one cluster.

The sequence clustering module 217 clusters similar sequences of the user actions together. The sequence clustering module 217 process the user actions and identifies the common sub-sequences of the user actions. FIG. 2b illustrates a block diagram of sequences clustering module in accordance with some embodiment of the present disclosure. As shown in FIG. 2b, the sequence clustering module 217 comprise sub modules namely unique identifier assigning module 225, parameterization field identification module 227, similarity score assigning module 229, similar sequence clustering module 231 and anomalous sequence eliminator module 233. The unique identifier assigning module 225 assigns a unique identifier to each type of the action of the user actions based on the unique signature of the action. In an embodiment, the type of action may comprise mouse clicks, key pressed etc. For example, the signature of each sequence in the user action may comprise the following form:

"ApplicationName|Action|SubAction|NormalizedRelativeWindowLocation (in pixels)"

The following sequences shows example of the above mentioned signature:

27183923|Calculator|KEY_PRESS|D0|image|Static||0|0|197452|| calc.exe|C: \Windows\system32\calc.exe|6180|405,227,633, 549                2

27184968|Calculator|KEY_PRESS|D1|image|Static||0|0|197452|| calc.exe|C: \Windows\system32\calc.exe|6180|405,227,633, 549                3

27185233|Calculator|KEY_PRESS|D2|image|Static||0|0|197452|| calc.exe|C: \Windows\system32\cale.exe|6180|405,227,633, 549                4

27185483|Calculator|KEY_PRESS|D3|image|Static||0|0|197452|| calc.exe|C: \Windows\system32\calc.exe|6180|405,227,633, 549                5

27185857|Calculator|KEY_PRESS|D4|image|Static||0|0|197452|| calc.exe|C: \Windows\system32\calc.exe|6180|405,227,633, 549                6

27207713|Calculator|MOUSE_DOWN|Left?1|button|| Stop|125|389|197634||calc.exe|C: \Windows\system32\calc.exe|6180|405,227,633, 549                7

In the above sequences, the application name is calculator and action type is either key press or mouse click. From this information, the unique identifier assigning module 225 uniquely identifies whether the action is key press or mouse click. Also, if it is a key press, then by taking the key value, the unique identifier assigning module 225 identifies which key is pressed. Further, to identify the key type, the unique identifier assigning module 225 identifies the unique signature of the sequence. For example, in the sample sequence given above, D0 key was pressed in calculator application at pixel location 405,227,633,549. The unique identifier assigning module 225 maintains a set of the type of user actions performed and assigns a unique identifier to each type of the actions in the set. For example, the identifier for the signature Calculator|KEY_PRESS|D0|405,227,633,549 is assigned as '1,' The identifier for the signature Calculator|KEY_PRESS|D1|405,227,633,549 is assigned as '2'.

The parameterization field identification module 227 identifies the potential parameterized variables from the sequences of user actions based on the possibility of formation of greater common sequences. In an embodiment, if there are two set of sequences which are almost same and differ only in few terms, then there is a possibility of these terms to be parameterized. For example, two user actions correspond to the following:

Get a material code for Nike T-shirt                8

Get a material code for Nike trouser                9

In the above sequence, both the user actions are same. The parameter is the values Nike T-shirt and Nike Trousers. The field name value is a parameter to be automated as only the name of field differs. Hence, the name value is a parameterized variable. The parameterization field identification module 227 identifies the parameterized variables by identifying the longest common sub-sequences of the user action between different pairs of sequences. In an embodiment, the parameterization identification module 227 attempts to expand the sequences by assuming few terms as variable terms. For example, consider the following sequences of a user action with assigned unique identifier.

Sequence 1=[0,1,2,3,4,5,6,7,8,9,10,11,12,13,14,15, 16, 17]

Sequence 2=[0,1,2,3,4,18,6,7,19,9,10,11]

In the above two sequences, the common sequences identified are [0, 1, 2, 3, 4], [6, 7], [9, 10, 11]. However, if the term 18, 19 are treated as variable parameters, the similar sequence expands to [0,1,2,3,4,18,6,7,19,9,10,11]. In an embodiment, the variable parameters represent fields with changing values in an application.

The similarity score assigning module 229 assigns a score to pair of sequences, where the score indicates the similarity among the pair of sequences of the plurality of the user actions. Once the parameterized variables are identified for given sequences, the similarity score is assigned to a pair of sequences by the similarity score assigning module 229. In an embodiment, the similarity score is in the range of 0-1. The similarity score assigning module 229 identifies the sub-sequences from the sequences which are common across multiple sequences. Further, by assigning a score, the similarity between the sequences are identified. The similarity score assigning module 229 assigns the scores based on configured rules. The below examples show some of the rules for scoring.

Rule 1: In an embodiment, if the sequences match completely, i.e. end to end and length of both the sequences is same, score=1.0.

Rule 2: If one sequence is subsequence of other, then scoring is done based on the length of pattern matched for example.

Sequence 1=[0, 1, 2, 3, 4, 5, 6, 7, 8, 9, 10, 11, 12, 13, 14, 15, 16, 17]
Sequence 2=[1, 2, 3, 4, 5] score=5/18=0.27
Sequence 3=[7, 8, 9, 10, 11, 12, 13, 14, 15, 16, 17] score=11/18=0.61

Rule 3: If one sequence is subsequence of other directly, however a larger subsequence is possible with a parameterized variable then scoring depends on the number of parameterized variables and length of directly matched patterns. For example, consider the following sequences.

Sequence 1=[0, 1, 2, 3, 4, 5, 6, 7, 8, 9, 10, 11, 12, 13, 14, 15, 16, 17]
Sequence 2=[0, 1, 2, 3, 4, 18, 6, 7] score=5/18+2/18=0.38
Sequence 3=[0, 1, 2, 3, 4, 18, 16, 7] score=5/18+1/18=0.33

Rule 4: If two sub-sequences of same length are matching, however one sequence matches at the end points while the other matches in between the larger sequence then the pattern that matches the sequence at the end points gets a higher score. For example, consider the following sequences.

Sequence 1=[0, 1, 2, 3, 4, 5, 6, 7, 8, 9, 10, 11, 12, 13, 14, 15, 16, 17]
Sequence 2=[0, 1, 2, 3, 4] score=5/18+0.1(due to presence at end points)=0.37
Sequence 3=[1, 2, 3, 4, 5] score=5/18=0.27

Rule 5: If subsets of a sequence are matching in the original sequence, then the scoring is done such that increasing number of parameterized variables reduces the score. For example, consider the following sequences.

Sequence 1=[0, 1, 2, 3, 4, 5, 6, 7, 8, 9, 10, 11, 12, 13, 14, 15, 16, 17]
Sequence 2=[0, 1, 11, 3, 4, 12, 6, 7]
Score=6/18−2*0.05 (due to two parameterized variables) =0.23
Sequence 3=[0, 1, 11, 12, 3, 4, 13, 14, 6, 7]
Score=6/18−4*0.05 (due to four parameterized variables) =0.13

Upon assigning score to sequences, the similar sequence clustering module 231 clusters the similar sequences of user actions together. The similar sequence clustering module 231 clusters the similar sequences based on the similarity score assigned. In an embodiment, each cluster of sequences is also called as buckets. The similar sequence clustering module 231 clusters the similar sequences into one or more buckets. The similar sequence clustering module 231 places the similar sequences of user actions into a single bucket. In a non-limiting embodiment, the similar sequence clustering module 231 clusters the similar sequences by a k-means clustering technique. The buckets comprise the sequences which may be automated for similar incident tickets. In an embodiment, the clustering is done based on a pre-set threshold. The incident tickets which have similarity score exceeding a configurable threshold and also a very close similarity scores are grouped together. The following shows example buckets.

Bucket 1: 'unable to login', 'login issue'.
Bucket 2: 'create purchase order for 10 Nike shirts', 'create purchase order for 20 Nike trousers'.

The anomalous sequence eliminator module 233 eliminates anomalous buckets based on the minimum number of sequences per bucket. In an embodiment, the buckets with less number of sequences are eliminated. The buckets of smaller size less than the configurable threshold are discarded as anomalous sequences.

Figure 3:
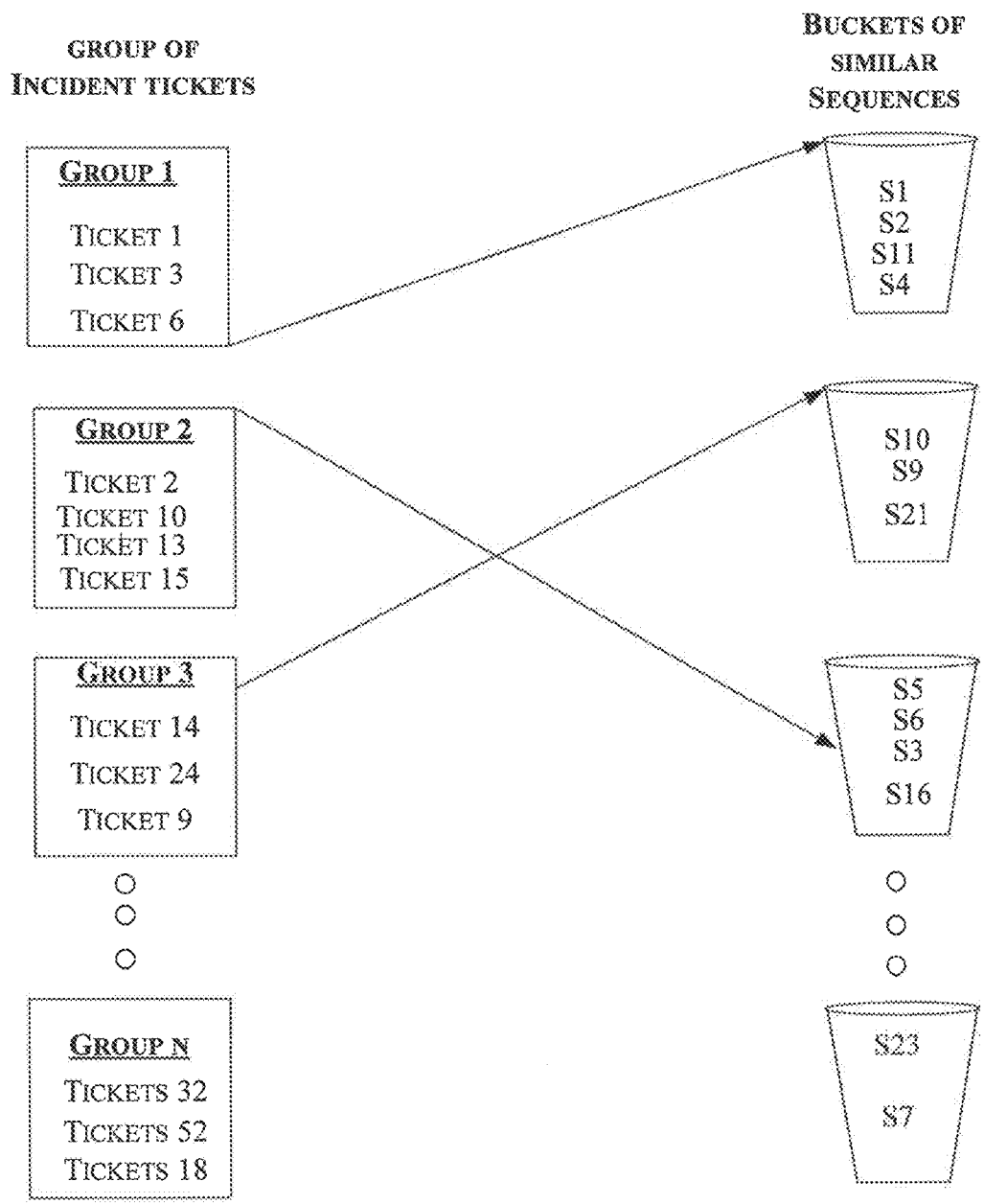
FIG. 3 shows an exemplary representation of correlation of incident tickets and cluster of sequences in accordance with some embodiment of the present disclosure.

Referring back to FIG. 2a, the automation sequence determination module 219 creates the actual automation sequences by correlating the descriptions of the plurality of incident tickets with the one or more buckets of similar sequences. FIG. 3 shows an exemplary representation of correlation of incident tickets and cluster of sequences in accordance with some embodiment of the present disclosure. FIG. 3 comprises a group of tickets, group 1, group 2 . . . group n and a buckets of sequences, bucket 1, bucket 2 . . . bucket n. As shown in FIG. 3, group 1 of incident tickets comprises ticket 1, ticket 3 and ticket 6 which are correlated with the bucket 1 of sequences S1, S2, S11 and S4. Similarly, group 2 of incident tickets comprises ticket 2, ticket 10, ticket 13 and ticket 15 which are correlated with the bucket 3 of sequences S5, S6, S3 and S16. The group of incident tickets indicates a unique type of incident ticket. Once the group of incident tickets are correlated with the bucket of sequences, every unique type of ticket is associated with a unique sequence. In an embodiment, this association information is stored as automatable sequence in the sequence database 109.

Returning to FIG. 2a, the sequences of user actions which are written to the sequence database 109 comprise automation benefit score. The automation benefit score is calculated by the automation benefit scorer module 221. The automation benefit scorer module 221 scores every sequence which is identified for automation. In an embodiment, a score of '1' indicates a maximum benefit of automation while a score of '0' denotes no benefit. The automation benefit scorer module 221 calculates the benefit score based on the number of times the automation sequence is used which is in turn based on the number of occurrences of the incident tickets across a time period.

Figure 4:
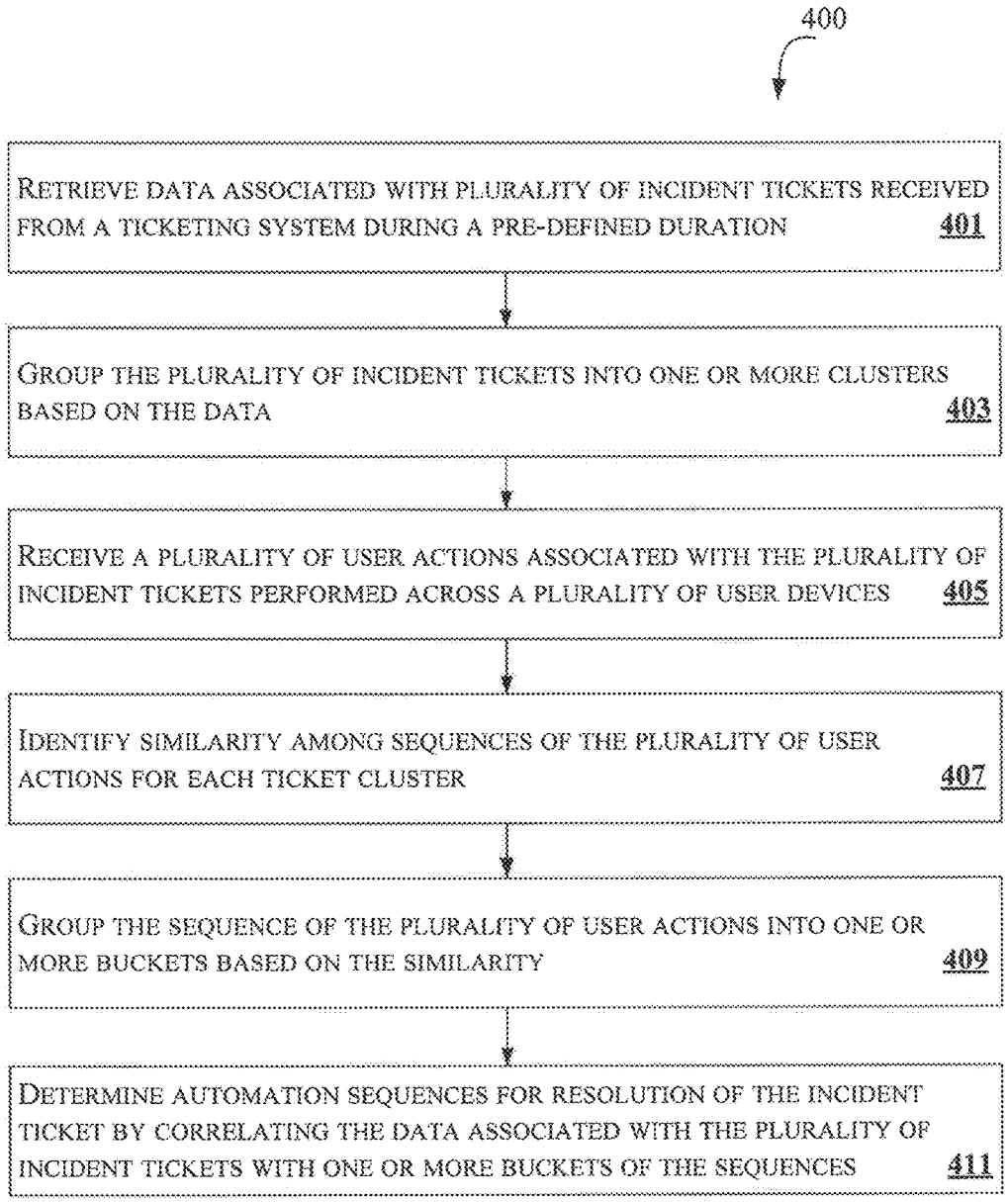
FIG. 4 illustrates a flowchart showing a method for determining automation sequences for resolution of incident tickets in accordance with some embodiments of present disclosure.

FIG. 4 illustrates a flowchart showing a method for determining automation sequences for resolution of an incident ticket in accordance with some embodiments of present disclosure.

As illustrated in FIG. 4, the method 400 comprises one or more blocks for determining automation sequences for resolution of an incident ticket. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the automation system 101 retrieves data associated with a plurality of incident tickets received from a ticketing system 105 during predefined time duration. In an embodiment, the data associated with the plurality of incident tickets comprises description of issues associated with each of the incident tickets.

At block 403, the automation system 101 groups the plurality of incident tickets into one or more clusters based on the data.

At block 405, the automation system 101 receives a plurality of user actions associated with the plurality of incident tickets performed across a plurality of user devices 103. In an embodiment, the plurality of user actions comprises information about at least one of launching an application, mouse and cursor movement, types of keystrokes, touch screen data, web portal access data, remote device access data, navigations across different applications, command and data entered and field data. Further the field data comprise application name, keys pressed by the users, location data of the key pressed, timestamps and user details performing the user actions.

At block 407, the automation system 101 identifies similarity among sequences of the plurality of user actions for each ticket cluster. The similarity is identified by assigning a unique identifier to each type of action of the plurality of user actions, identifying one or more parameterized variables between each pair of sequences based on greatest common sub-sequence between each pair of sequences and assigning a score to each pair of sequences based on the one or more parameterized variables and one or more parameters, where the score indicates similarity among sequences of the plurality of the user actions. In an embodiment, the one or more parameters comprise at least one of length of matched patterns between the pair of sequences, number of the one or more parameterized variables in the pair of sequences, sequences matching at end points and in between in the pair of the sequences.

At block 409, the automation system 101 groups the sequences of the plurality of user actions into one or more buckets based on the similarity.

At block 411, the automation system 101 determines automation sequences for resolution of the incident ticket by correlating the data associated with the plurality of incident tickets with one or more buckets of the sequences.

Computing System

Figure 5:
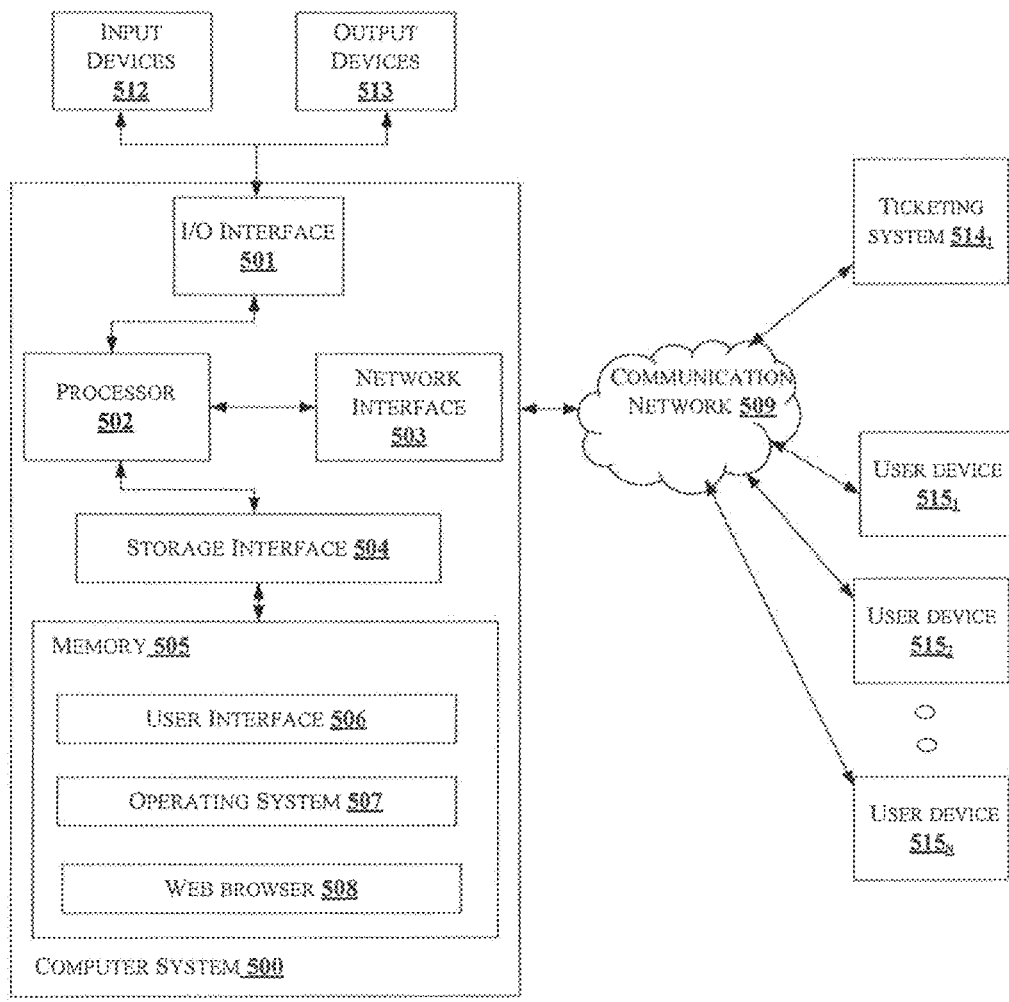
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the automation system. The computer system 500 may comprise a central processing unit ("CPU" or "processor") 502. The processor 502 may comprise at least one data processor for determining automation sequences for resolution of incident tickets. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of an automation system. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with ticketing system 514 and a user device 515$_1$, user device 515$_2$, . . . user device 515$_n$(collectively referred as user device 515). The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network. (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In some embodiments, computer system 500 may store user/application data 506, such as the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kuhuntu, etc.), IBM OS/2, Microsoft Windows (XP, Vista/7/8, etc.), Apple iOS, Google Android, Blackberry OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI). Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

An embodiment of the present disclosure determines automation sequences for resolution of an incident ticket automatically.

An embodiment of the present disclosure provides faster resolution of the incident tickets.

An embodiment of the present disclosure automates the resolution of the tickets with minimum user intervention.

An embodiment of the present disclosure provides a benefit score along with the automation to indicate the benefit of the automation performed.

The present disclosure determines the automation sequences for the incident tickets and thereby reduces the manual work of resolving tickets.

The described operations may be implemented as a method, system or article of manufacture using standard programming and/or engineering techniques to produce software, firmware, hardware, or any combination thereof.

The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral numerals:

| Reference Number | Description |
| --- | --- |
| 100 | Environment |
| 101 | Automation system |
| 103 | Plurality of user devices |
| 105 | Ticketing system |
| 107 | Ticket database |
| 109 | Sequence database |
| 111 | Communication network |
| 113 | I/O interface |
| 115 | Memory |
| 117 | Processor |
| 119 | Monitoring unit |
| 121 | User action capturing module |
| 123 | Training file creator module |
| 125 | User action improviser module |
| 127 | Signature logger module |
| 200 | Data |
| 201 | Incident tickets data |
| 203 | User action data |
| 205 | Sequence data |
| 207 | Automation sequence data |
| 209 | Other data |
| 211 | Modules |
| 213 | Receiving module |
| 215 | Incident tickets clustering module |
| 217 | Sequence clustering module |
| 219 | Automation sequence determination module |
| 221 | Automation benefit scorer module |
| 223 | Other modules |
| 225 | Unique identifier assigning module |
| 227 | Parameterization field identification module |
| 229 | Similarity score assigning module |
| 231 | Similar sequence clustering module |
| 233 | Anomalous sequence eliminator module |

What is claimed is:

1. A method for determining automation sequences for resolution of an incident ticket, the method comprising:
    retrieving, by an automation system, data associated with plurality of incident tickets received from a ticketing system during a predefined time duration;
    grouping, by the automation system, the plurality of incident tickets into one or more clusters based on the data;
    receiving, by the automation system, a plurality of user actions associated with the plurality of incident tickets performed across a plurality of user devices;
    identifying, by the automation system, similarity among sequences of the plurality of user actions for each ticket cluster based on one or more configured rules, wherein identifying the similarity among sequences of the plurality of user actions comprises identifying one or more parameterized variables between each pair of sequences based on greatest common sub-sequence between each pair of sequences and assigning a score to each pair of sequences based on the one or more parameterized variables and one or more parameters, wherein the score indicates similarity among sequences of the plurality of the user actions;
    grouping, by the automation system, the sequences of the plurality of user actions into one or more buckets based on the similarity;
    determining, by the automation system, automation sequences for resolution of the incident ticket by correlating the data associated with the plurality of incident tickets with the one or more buckets of the sequences; and
    eliminating the one or more buckets based on minimum number of sequences in the corresponding bucket.

2. The method as claimed in claim 1, wherein the data associated with the plurality of incident tickets comprises description of issues associated with each of the tickets.

3. The method as claimed in claim 1, wherein the plurality of user actions comprise information about at least one of launching an application, mouse and cursor movement, types of keystrokes, touch screen data, web portal access data, remote device access data, navigations across different applications, command and data entered and field data.

4. The method as claimed in claim 3, wherein the field data comprise application name, keys pressed by the users, location data of the key pressed, timestamps and user details performing the user actions.

5. The method as claimed in claim 1, wherein identifying the similarity among sequences of the plurality of user actions further comprises assigning, by the automation system, a unique identifier to each type of action of the plurality of user actions.

6. The method as claimed in claim 5, wherein the one or more parameters comprise at least one of length of matched patterns between the pair of sequences, number of the one or more parameterized variables in the pair of sequences, sequences matching at end points and in between in the pair of the sequences.

7. An automation system for determining automation sequences for resolution of an incident ticket comprising:
    a processor; and
    a memory communicatively coupled to the processor, wherein the memory stores processor instructions, which, on execution, causes the processor to:
        retrieve data associated with plurality of incident tickets received from a ticketing system during a predefined time duration;

group the plurality of incident tickets into one or more clusters based on the data;
receive a plurality of user actions associated with the plurality of incident tickets performed across a plurality of user devices;
identify similarity among sequences of the plurality of user actions for each ticket cluster based on one or more configured rules, wherein identifying the similarity among sequences of the plurality of user actions comprises identifying one or more parameterized variables between each pair of sequences based on greatest common sub-sequence between each pair of sequences and assigning a score to each pair of sequences based on the one or more parameterized variables and one or more parameters, wherein the score indicates similarity among sequences of the plurality of the user actions;
group the sequences of the plurality of user actions into one or more buckets based on the similarity;
determine automation sequences for resolution of the incident ticket by correlating the data associated with the plurality of incident tickets with the one or more buckets of the sequences; and
eliminate the one or more buckets based on minimum number of sequences in the corresponding bucket.

8. The automation system as claimed in claim 7, wherein the data associated with the plurality of incident tickets comprises description of issues associated with each of the tickets.

9. The automation system as claimed in claim 7, wherein the plurality of user actions comprise information about at least one of launching an application, mouse and cursor movement, types of keystrokes, touch screen data, web portal data, remote device access data, navigations across different applications, command and data entered and field data.

10. The automation system as claimed in claim 9, wherein the field data comprise application name, keys pressed by the users, location data of the key pressed, timestamps and user details performing the user actions.

11. The automation system as claimed in claim 7, wherein the processor identifies similarity among sequences of the plurality of user actions by
assigning a unique identifier to each type of action of the plurality of user actions.

12. The automation system as claimed in claim 11, wherein the one or more parameters comprise at least one of length of matched patterns between the pair of sequences, number of the one or more parameterized variables in the pair of sequences, sequences matching at end points and in between in the pair of the sequences.

13. A non-transitory computer readable medium including instruction stored thereon that when processed by at least one processor cause an automation system to perform operation comprising:

retrieving data associated with plurality of incident tickets received from a ticketing system during a predefined time duration;
grouping the plurality of incident tickets into one or more clusters based on the data;
receiving a plurality of user actions associated with the plurality of incident tickets performed across a plurality of user devices;
identifying similarity among sequences of the plurality of user actions for each ticket cluster based on one or more configured rules, wherein identifying the similarity among sequences of the plurality of user actions comprises identifying one or more parameterized variables between each pair of sequences based on greatest common sub-sequence between each pair of sequences and assigning a score to each pair of sequences based on the one or more parameterized variables and one or more parameters, wherein the score indicates similarity among sequences of the plurality of the user actions;
grouping the sequences of the plurality of user actions into one or more buckets based on the similarity;
determining automation sequences for resolution of the incident ticket by correlating the data associated with plurality of incident tickets with the one or more buckets of the sequences; and
eliminating the one or more buckets based on minimum number of sequences in the corresponding bucket.

14. The medium as claimed in claim 13, wherein the data associated with the plurality of incident tickets comprises description of issues associated with each of the tickets.

15. The medium as claimed in claim 13, wherein the plurality of user actions comprises information about at least one of launching an application, mouse and cursor movement, types of keystrokes, touch screen data, web portal data, remote device access data, navigations across different applications, command and data entered and field data.

16. The medium as claimed in claim 15, wherein the field data comprise application name, keys pressed by the users, location data of the key pressed, timestamps and user details performing the user actions.

17. The medium as claimed in claim 13, wherein the instruction causes the at least one processor to identify similarity among sequences of the plurality of user actions by
assigning a unique identifier to each type of action of the plurality of user actions.

18. The medium as claimed in claim 17, wherein the one or more parameters comprise at least one of length of matched patterns between the pair of sequences, number of the one or more parameterized variables in the pair of sequences, sequences matching at end points and in between in the pair of the sequences.

* * * * *